April 30, 1968    L. R. TRUMPORE    3,380,606
LIFT TRUCK

Filed Jan. 4, 1966    4 Sheets-Sheet 1

INVENTOR
LAWRENCE R. TRUMPORE
BY *Richards & Cifelli*
ATTORNEY

April 30, 1968

L. R. TRUMPORE 3,380,606

LIFT TRUCK

Filed Jan. 4, 1966

INVENTOR
LAWRENCE R. TRUMPORE
BY
ATTORNEY

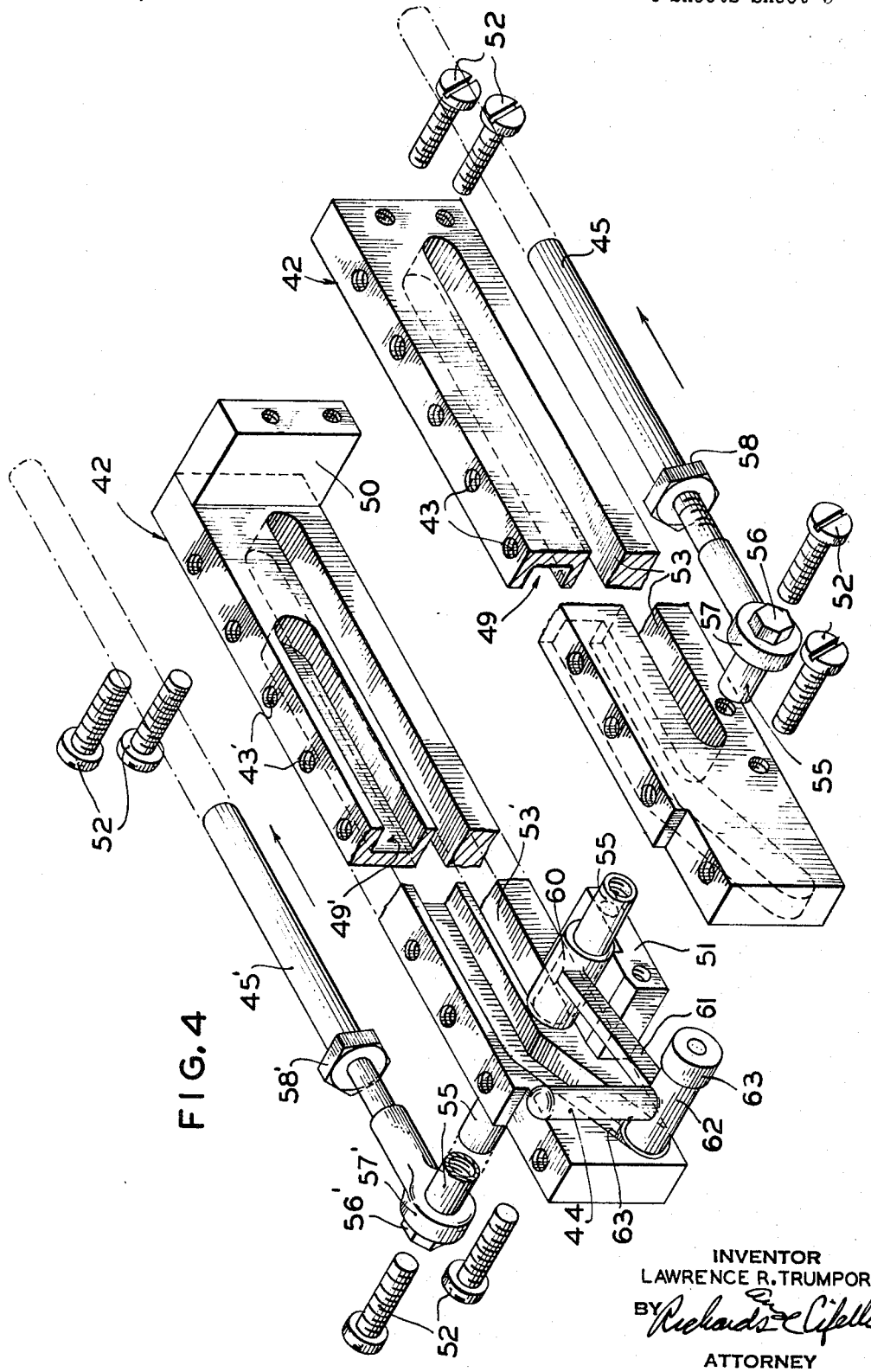

April 30, 1968     L. R. TRUMPORE     3,380,606
LIFT TRUCK
Filed Jan. 4, 1966     4 Sheets-Sheet 4
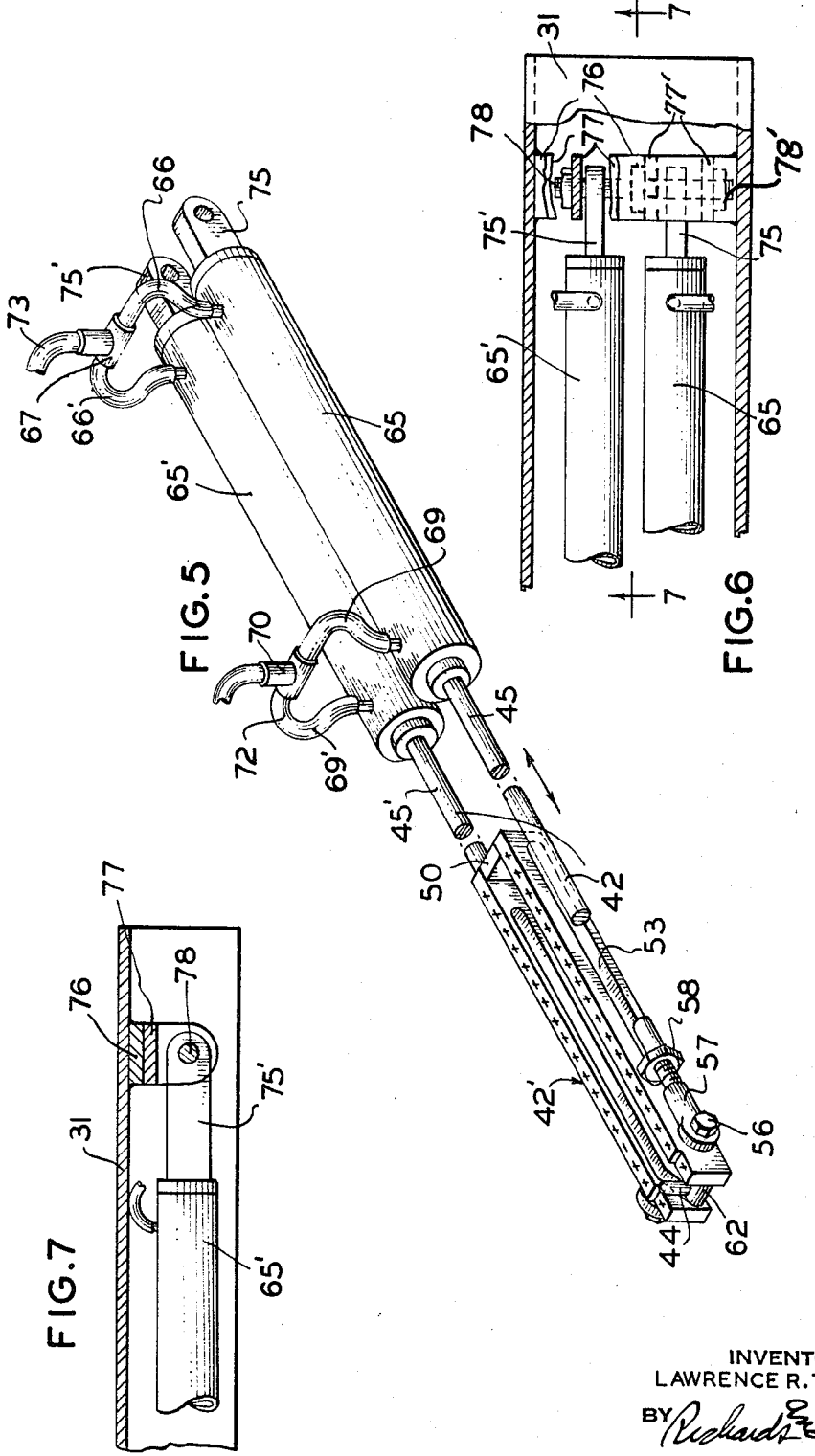
INVENTOR
LAWRENCE R. TRUMPORE
ATTORNEY

# United States Patent Office 3,380,606
Patented Apr. 30, 1968

3,380,606
LIFT TRUCK
Lawrence R. Trumpore, 47 Ackerman St.,
Bloomfield, N.J. 07003
Filed Jan. 4, 1966, Ser. No. 518,664
5 Claims. (Cl. 214—505)

ABSTRACT OF THE DISCLOSURE

A self-propelled industrial lift truck, particularly adapted for the handling of materials contained in large baskets, such as tobacco leaves in wicker baskets, is described. The truck includes a generally horizontal platform having an inclined ramp at its forward end to facilitate driving the platform under a basket. A pneumatically operated load-grabbing pin mounted for longitudinal movement on the platform is adapted to engage the basket and draw it onto the platform. Additional pneumatic means are provided for tilting the load platform upwardly about a horizontal pivot axis to facilitate movement of the truck along a ramp by means of a liquid propane powered engine.

---

This invention relates to industrial lift trucks and more particularly to an improved construction and arrangement of the load-supporting members.

A lift truck made in accordance with this invention has general industrial utility but it is particularly adapted for the handling of materials contained in large baskets, as, for example, tobacco leaves contained in wicker baskets. Briefly, the truck comprises a generally horizontal platform having an inclined ramp plate at its forward end, thereby to facilitate driving the platform under a basket, or other load. A load-grabbing pin, mounted for longitudinal movement on the floor of the platform, is arranged to enter into one of the many openings in the bottom of the basket and thereafter is retractable, by pneumatic means, to draw the basket onto the platform. Additional pneumatic means are provided for tilting the platform upwardly about a horizontal pivot axis, thereby to facilitate movement of the truck along a ramp. The power for driving the truck is provided by a liquid propane powered engine.

An object of this invention is the provision of a lift truck having improved load-handling features.

An object of this invention is the provision of a lift truck having a platform slidably positionable under a load, and means carried by the platform for drawing the load onto the platform to a desired position.

An object of this invention is the provision of a power-driven lift truck of the class having a forwardly-extending, load-carrying platform, said truck including pneumatic means for tilting the platform upwardly about a horizontal pivot axis, thereby to facilitate movement of the truck on inclined surfaces and to minimize vibration of the supported load during transport thereof.

An object of this invention is the provision of a lift truck having improved load-carrying means, which means comprises a generally horizontal platform terminating in a downwardly inclined ramp plate, a plurality of load-bearing rollers carried by the platform, a pair of rails carried by the platform and having formed therein guide channels which terminate in downwardly-inclined portions in the region of the ramp plate, and a pivotally-mounted pin movable along the guide channels by pneumatic means.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 4 is an exploded, isometric view showing the components of the mechanism for grabbing a load and drawing it to a desired position onto the platform;

FIGURE 5 is an isometric view showing the pneumatically-actuated cylinders and connecting rods for effecting movement of the load-grabbing pin along the guide channels formed in the trackway extending longitudinally of the platform;

FIGURE 6 is a fragmentary, top plan view showing the pivotal mounting of the pneumatic cylinders on the center beam of the platform, portions of the platform being broken away; and FIGURE 7 is a sectional view taken along the line 7—7 of FIGURE 6.

Figure 1:
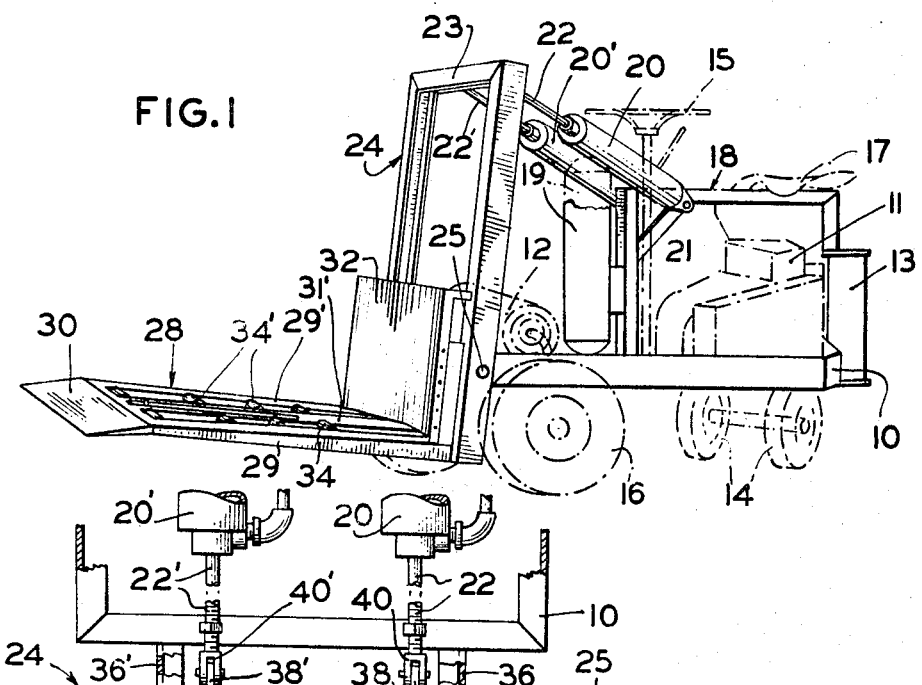
FIGURE 1 is a general view of a lift truck made in accordance with this invention.

Reference now is made to FIGURE 1 wherein there is shown a chassis 10 carrying conventional components for propelling the truck, specifically, a liquid propane powered motor 11 together with a compressed fuel tank 12 and a muffler 13, rear steering wheels 14 controllable by means of a steering wheel 15, front drive wheels 16 and a seat 17. The liquid propane powered motor is desirable since the engine fumes are not toxic, but it is apparent other types of motors may be used. An inverted, generally U-shaped strut 18, made of channel iron, is rigidly secured to the chassis and serves as a support for the seat and a storage tank 19 containing a compressed gas, e.g. air. This gas is used to operate a pair of pneumatic cylinders 20, 20' having their casings pivotally coupled to angle braces 21, said cylinders having piston rods 22, 22' pivotally connected to the upper cross bar 23 of a vertical, open frame member 24. Upon actuation of the cylinders 20, 20', the frame member is tilted about a horizontal pivot axis defined by a pivot rod 25 carried at the forward end of the chassis.

Extending forwardly of the frame member 24 is a load-carrying platform 28 formed of the side members 29, 29', of rectangular cross-sectional configuration, spanned by a ramp plate 30 having a downwardly-inclined upper surface. Extending longitudinally of the platform is a center beam 31 comprising an inverted, U-shaped channel iron. A curved back plate 32 extends upwardly from the platform and along the vertical frame member. The described side members, ramp plate, center beam, back plate and vertical frame member are welded together to form a rigid, unitary structure. A plurality of spaced rollers 34 and 34' are rotatably carried by the center beam 31 and the side members 29, 29', which rollers have peripheral surfaces extending somewhat above the plane of the side members and center beam.

Figure 2:
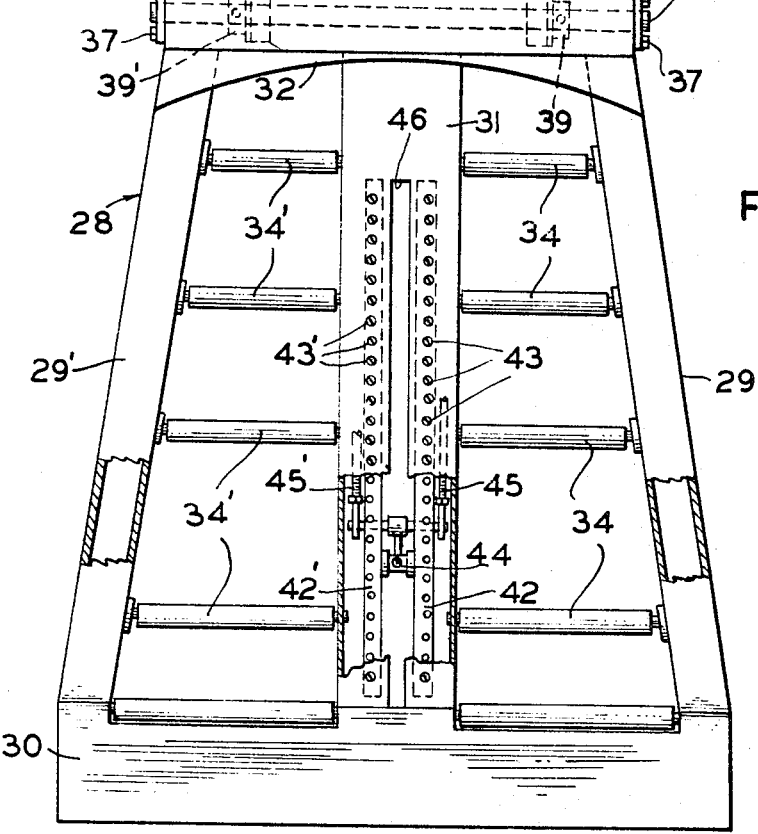
FIGURE 2 is an enlarged, fragmentary plan view of the load-carrying platform and tilting mechanism.

Referring now to the enlarged, fragmentary top plan view of FIGURE 2, it will be seen that the pivot rod 25 extends through aligned holes formed in the two channel irons 36, 36' welded to the chassis and extending forwardly thereof. The pivot rod 25 also passes through aligned holes formed in the vertical frame member 24 and suitable bearings and is secured in position by bolts 37. Locating collars 39, 39', secured to the pivot rod by set screws, serve to retain the load-carrying platform in proper alignment relative to the vertical frame member. Welded to the upper cross bar of the vertical frame member are a pair of parallel arms 38, 38' having aligned holes formed therein. A pair of clevises 40, 40', pivotally connected to the associated arms 38, 38' by means of coupling pins, are carried by the piston rods 22, 22' of the pneumatic cylinders 20, 20', respectively. Such pivotal connection of the piston rods to the frame member, together with the pivotal connection of the cylinders to the supporting structure of the truck, see FIGURE 1, affords translatory movement of the cylinders and piston rods as the vertical frame member is tilted in one or the other direction. It is here pointed out that the use of pneumatic cylinders for tilting of the frame member and the load-carrying platform minimizes the transfer of road shocks to the carried load.

With continued reference to FIGURE 2, the rollers 34, 34' are rotatable about individual shafts carried by the center beam 31 and the platform side members 29, 29', the ramp plate 30 being provided with cut-away portions to clear the proximate rollers. Positioned within the center beam are a pair of parallel rails 42, 42' having threaded holes formed in the upper surfaces thereof. These rails are secured in place by a plurality of screws 43 passing through holes provided in the base portion of the inverted, U-shaped center beam. As will be described in detail hereinbelow, there are complementary guide channels formed in the facing sides of the rails, which channels define the path of travel for a pivotally-mounted, load-grabbing pin 44. Movement of this pin, toward and away from the vertical frame member 24, is effected by a pair of piston rods 45, 45' associated with a pair of pneumatically-actuated cylinders, which cylinders are not shown in FIGURE 2 but are also disposed under the center beam 31. The upper surface of the center beam has formed therein a longitudinal slot 46 through which the load-grabbing pin 44 extends during its movement along the rails 42, 42'.

Figure 3:
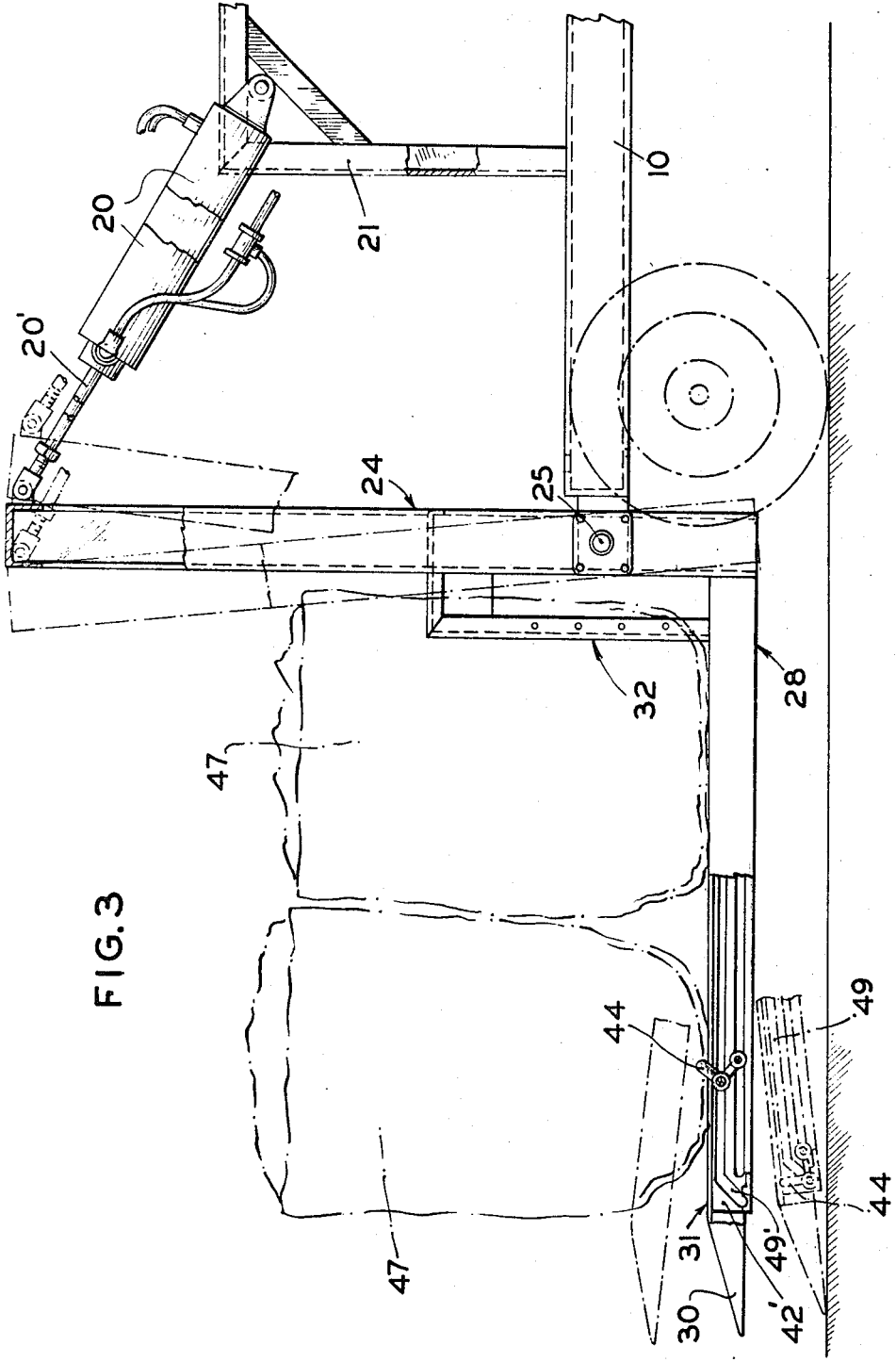
FIGURE 3 is a fragmentary, side elevational view showing the platform in various operative positions and with a portion of the platform broken away to show the load-grabbing pin and associated guide channels.

As shown in the fragmentary, side elevational view of FIGURE 3, when the vertical frame member is tilted in a counterclockwise direction about the pivot rod 25, the ramp plate 30 rests upon the floor, thereby facilitating the sliding movement of the load-carrying platform 28 partially under a load (here shown as two baskets 47), as the truck is power-driven forwardly. During such initial movement of the platform, the load-grabbing pin 44 is positioned proximate to the ramp plate and with its upper end somewhat below the surface of the center beam 31. Upon actuation of a suitable control lever by the operator, the pneumatic cylinders (carried by the platform) move the pin 44 rearwardly (that is, toward the vertical frame member 24). As will be described hereinbelow, the path of movement of the load-grabbing pin is defined by the guide channels formed in the rails, one such rail 42' and the associated channel 49' being visible in this particular view. During such rearward movement of the pin 44, it first moves along the forward, inclined portion of the guide channel, thereby resulting in an elevation of the pin so that it enters into one of the many holes available in the bottom of a wicker basket. As the pin moves along the inclined portion of the guide channel, it also is rotated in a clockwise direction, whereby further movement of this pin results in a movement of the loading basket up against the back plate 32. With the load now effectively clamped against the back plate, the load may be transported to another location with the platform in the raised position, parallel to the floor. Alternatively, the operator may cause operation of the pneumatic cylinder 20, 20' (see also FIGURE 1) thereby to further tilt the platform, particularly when the load is to be moved along an inclined surface, such as a ramp. Although not shown in FIGURE 3, the load is moved toward the back plate, by the load-grabbing pin 44, over the rollers, see FIGURE 2.

The construction of the mechanism for moving a load onto the platform is shown in the exploded, isometric view of FIGURE 4. The rails 42 and 42', having the threaded holes 43 formed in the upper surfaces, are secured to the spacer blocks 50 and 51 by means of a plurality of screws 52. Formed in the facing walls of the rails are the complementary guide channels 49 and 49', it being noted that the forward (left) portion of these channels slopes downwardly. Also formed in the rails 42, 42' are aligned slots respectively identified by the numerals 53, 53', said slots terminating at points proximate to the points where the guide channels slope downwardly. A hollow shaft 55 extends through the slots 53, 53', which shaft has internally-threaded ends for receiving the fastening bolts 56 and 56' by means of which the end bearings 57 and 57' are connected to the shaft 55. These end bearings have formed therein clearance holes for the bolts 56, 56' and have threaded shanks threaded into the ends of the associated piston rods 45, 45'. Associated lock nuts 58 and 58' serve to secure each end bearing in proper position relative to its associated piston rod. Inserted over the shaft 55 is a rotatable bushing 60 having an axial length somewhat less than the transverse width of the spacing blocks 50, 51. Thus, this bushing is free to rotate about the supporting shaft 55 as such shaft is moved along the aligned slots 53 and 53' by the piston rods 45, 45'. A central bar 61 has one end welded to the bushing 60 and the other end welded to a solid rod 62, which has reduced-diameter ends carrying the roller bushings, or preferably, Teflon lined spherical bearings 63. The load-grabbing pin 44 is welded to the rod 62. When the two rails are secured to the two spacer blocks, the Teflon lined spherical bearings 63 are disposed within the guide channels 49 and 49'. When the mechanism is in the illustrated position, the pin 44 is disposed in a vertical position, in which position its free end lies below the surface of the central beam to which the two rails are secured. Now, as the shaft 55 is moved along the aligned slots 53, 53', the roller bushings rotate relative to the rod 62 and move along the sloped portions of the guide channels. It will be apparent that as these roller bushings advance upwardly along the sloped portions of the guide channels, the pin 44 is elevated and, at the same time, rotated about the axis of the shaft 55. Thus, when the roller bushings move along the main portions of the guide channels, the pin 44 extends above the surface of the central beam 31, see FIGURE 3, and is inclined toward the vertical frame member 24, for purposes which already have been explained.

Reference now is made to FIGURE 5, showing the assembly of the pneumatic cylinders 65, 65' and the associated piston rods 45, 45' for effecting movement of the load-grabbing pin 44 along the guide channels formed in the rails. Flexible hoses 66, 66' are connected between a T-coupling 67 and hose-connection nipples provided at one end of each cylinder. Similarly, flexible hoses 69, 69' are connected between the other ends of the cylinders and a T-coupling 70. The assembly shown in FIGURE 5 is disposed beneath the center beam and is secured in operative position by screws threaded in the holes formed in the upper surfaces of the two rails 42, 42', see also FIGURE 2. The main line hoses 72 and 73 are connected to the compressed gas tank 19, shown in FIGURE 1, through a suitable 3-way, manually-operable control valve located on the truck. Actuation of the control valve to a first position permits gas, under pressure, to flow through the main line hose 73 while, at the same time, venting the other ends of the cylinders through the main line hose 72. This drives the piston rods 45, 45' forwardly, the limit of such forward movement being reached when the roller bushings, carried by the rod 62, are disposed at the bottom of the sloped portions of the guide channels. In this position, the load-grabbing pin 44 is disposed substantially in the illustrated vertical position and below the upper surface of the center beam. Actuation of the control valve to the second position results in a reverse movement of the piston rods whereby the pin 44 is first elevated and rotated and then moved linearly along the straight portions of the guide channels. Unobstructed movement of the pin along the straight portions of the guide channels is afforded by the longitudinal slot formed in the overlying surface of the center beam, see slot 46 in FIGURE 2.

In order to permit free movement of the piston rods 45 and 45' over the full angular range of upward and downward tilting of the load-carrying platform, the casings of the pneumatic cylinders 65, 65', FIGURE 5, have secured thereto lugs 75, 75' provided with aligned holes. As shown in the fragmentary, top plan view of FIGURE 6, the center beam 31 has welded thereto a cross plate 76. Welded to this cross plate are U-shaped brackets 77, and 77', the side arms of which extend downwardly and are provided with aligned holes for receiving pivot bolts 78, and 78', which bolts extend through the holes formed in the lugs 75 and 75', see also FIGURE 7, which is a sectional view taken along the line 7—7 of FIGURE 6. The pivot rod 78 is secured in position by suitable means such as, for example, nuts threaded onto the rod ends.

Having now described the invention, those skilled in this art will be able to make various changes and modifications without thereby departing from the scope and spirit of the invention as recited in the following claims.

I claim:
1. A self-propelled lift truck comprising,
   (a) a chassis,
   (b) a vertically-disposed frame member pivotally-connected to the chassis for rotation about a horizontal axis,
   (c) a load-carrying platform comprising spaced side members having ends secured to the lower end of the said frame member,
   (d) a downwardly-inclined ramp plate extending across and secured to the other ends of said side members,
   (e) an inverted, U-shaped beam having ends secured to the said ramp plate and the lower end of said frame member,
   (f) means forming a longitudinal slot in the base portion of said central beam,
   (g) a pair of spaced, parallel rails secured to the base portion of said central beam and disposed between the side arms thereof,
   (h) means forming complementary guide channels in the facing walls of said rails, which channels terminate in downwardly-sloping portions proximate to said ramp plate,
   (i) means forming transversely-aligned slots in the said rails.
   (j) a shaft extending through the said slots,
   (k) a first pair of pneumatically-actuated cylinders pivotally carried by said center beam and having piston rods pivotally connected to the ends of said shaft,
   (l) a sleeve bushing carried by said shaft and disposed between the said rails, said bushing having a rigid arm secured thereto,
   (m) a rod secured to said arm, said rod carrying (roller bushings) rotatable in the said guide channels,
   (n) a load-grabbing pin secured to said rod, said pin being movable along said guide channels in correspondence with movement of the said shaft within the aligned slots formed in the rails, and
   (o) a second pair of pneumatically-actuated cylinders pivotally connected between the upper end of said frame member and a support secured to the chassis.

2. A lift truck comprising,
   (a) a chassis,
   (b) a vertically-disposed member,
   (c) means pivotally coupling said member to the chassis for rotation about a horizontal pivot axis,
   (d) a load-carrying platform having one end secured to the lower end of said member,
   (e) a ramp plate secured to the other end of the platform and having a downwardly-sloping surface,
   (f) a plurality of rollers carried by the platform and extending beyond the upper surface thereof,
   (g) means forming a guide channel extending longitudinally of said platform,
   (h) a load-grabbing pin movable along said guide channel,
   (i) a pair of pneumatic cylinders,
   (j) means connecting the piston rods of said cylinders to said pin, and
   (k) actuating means for rotating said member about said pivot axis.

3. A self-propelled lift truck having a chassis, said truck comprising,
   (a) a vertically-disposed frame member,
   (b) means pivotally coupling said frame member to the chassis for rotation about a horizontal pivot axis,
   (c) an open-frame, load-carrying platform having one end rigidly secured to the lower end of said frame member,
   (d) a pair of pneumatically-operated cylinders pivotally secured to the chassis and the said frame member,
   (e) a downwardly inclined ramp plate secured to the other end of the said platform,
   (f) a center beam secured to opposed ends of the said platform,
   (g) spaced sets of rollers carried by the said center beam and sides of the said platform,
   (h) spaced parallel rails secured to said center beam and extending longitudinally of the platform,
   (i) means forming complementary guide channels in the facing surfaces of said rails,
   (j) a load-grabbing pin,
   (k) guide means pivotally-connected to said pin and movable along a path defined by said guide channels, and
   (l) a second pair of pneumatically-operated cylinders arranged to move said guide means along said path.

4. The invention as recited in claim 3, including means pivotally-coupling said second cylinders to said center beam.

5. The invention as recited in claim 3, wherein the said guide channels terminate in downward sloping portions proximate to the said ramp plate.

References Cited

UNITED STATES PATENTS

| 26,421 | 12/1859 | Francher | 214—84 X |
| 2,531,545 | 11/1950 | Adams. | |
| 2,733,825 | 2/1956 | Evans | 214—672 |
| 3,272,546 | 9/1966 | Cooley | 214—516 X |

FOREIGN PATENTS

| 211,678 | 8/1957 | Australia. |

GERALD M. FORLENZA, *Primary Examiner.*

ALBERT J. MAKAY, *Examiner.*